(12) United States Patent
Qiu et al.

(10) Patent No.: US 11,480,104 B2
(45) Date of Patent: Oct. 25, 2022

(54) GAS TURBINE ENGINE INLET

(71) Applicant: UNITED TECHNOLOGIES CORPORATION, Hartford, CT (US)

(72) Inventors: Yuan J. Qiu, Glastonbury, CT (US); Robert M. Miller, Bloomfield, CT (US); Wesley K. Lord, South Glastonbury, CT (US); Gavin Hendricks, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1667 days.

(21) Appl. No.: 14/767,396

(22) PCT Filed: Feb. 26, 2014

(86) PCT No.: PCT/US2014/018544
§ 371 (c)(1),
(2) Date: Aug. 12, 2015

(87) PCT Pub. No.: WO2014/137685
PCT Pub. Date: Sep. 12, 2014

(65) Prior Publication Data
US 2016/0003145 A1 Jan. 7, 2016

Related U.S. Application Data

(60) Provisional application No. 61/772,460, filed on Mar. 4, 2013.

(51) Int. Cl.
*F02C 7/04* (2006.01)
*F02K 3/06* (2006.01)
(Continued)

(52) U.S. Cl.
CPC .................. *F02C 7/04* (2013.01); *F01D 5/02* (2013.01); *F01D 17/105* (2013.01); *F01D 25/24* (2013.01);
(Continued)

(58) Field of Classification Search
CPC .... F02C 7/04; F02C 7/042; F02C 3/04; F02C 7/047; F02K 3/04; F02K 3/06;
(Continued)

(56) References Cited

U.S. PATENT DOCUMENTS 3,222,863 A * 12/1965 Klees ...................... F02C 7/042
138/43
3,546,882 A * 12/1970 Berkey ..................... F02C 7/18
415/79

(Continued)

FOREIGN PATENT DOCUMENTS

FR 2958974 10/2011
GB 1190364 5/1970
(Continued)

OTHER PUBLICATIONS

Clark "Inlet Shape Effects On The Far Field Sound Of A Model Fan" 1997.*

(Continued)

*Primary Examiner* — Arun Goyal
*Assistant Examiner* — William L Breazeal
(74) *Attorney, Agent, or Firm* — Carlson, Gaskey & Olds, P.C.

(57) ABSTRACT

A gas turbine engine that includes a fan nacelle and a core nacelle that provide a bypass flow path radially between. The fan nacelle has an inlet including a throat. The inlet has an inlet forward-most point. A fan is arranged in the bypass flow path and rotatable about an axis. The fan has a leading edge recessed from the inlet forward-most point an inlet (Continued)

length in an axial direction. A spinner has a spinner length from a spinner forward-most point to the leading edge. A ratio of the spinner length to inlet length is equal to or greater than about 0.5.

11 Claims, 3 Drawing Sheets

(51) Int. Cl.
| | |
|---|---|
| F01D 5/02 | (2006.01) |
| F01D 17/10 | (2006.01) |
| F01D 25/24 | (2006.01) |
| F02C 3/04 | (2006.01) |
| B64D 33/02 | (2006.01) |

(52) U.S. Cl.
CPC .............. *F02C 3/04* (2013.01); *F02K 3/06* (2013.01); *B64D 2033/0286* (2013.01); *F05D 2220/32* (2013.01); *F05D 2220/36* (2013.01); *F05D 2240/303* (2013.01); *F05D 2250/323* (2013.01); *F05D 2250/511* (2013.01); *F05D 2260/40* (2013.01); *Y02T 50/60* (2013.01)

(58) Field of Classification Search
CPC .......... F02K 3/068; F01D 5/02; F01D 17/105; F01D 25/24; B64D 2033/0286; F05D 2220/36; F05D 2220/32; F05D 2240/303; F05D 2250/323; F05D 2250/511; F05D 2260/40; B64C 11/14
USPC ....................................................... 60/226.1
See application file for complete search history.

(56) References Cited

U.S. PATENT DOCUMENTS

| | | | | |
|---|---|---|---|---|
| 3,623,494 | A * | 11/1971 | Poucher | .................. F02C 7/042 137/15.2 |
| 3,763,874 | A * | 10/1973 | Wilde | ..................... F02C 7/042 137/15.1 |
| 3,946,830 | A | 3/1976 | Kutney et al. | |
| 4,129,984 | A * | 12/1978 | Nelson | .................... F02C 7/047 137/15.1 |
| 4,142,365 | A * | 3/1979 | Sargisson | ................ F02K 1/386 181/220 |
| 4,240,250 | A * | 12/1980 | Harris | .................... F02C 7/045 415/119 |
| 5,145,126 | A * | 9/1992 | Patilla | .................... B64D 33/02 137/15.1 |
| 5,915,403 | A | 6/1999 | McConachie et al. | |
| 7,770,377 | B2 | 8/2010 | Rolt | |
| 2006/0056977 | A1* | 3/2006 | Ramstein | ................ F02C 7/042 416/245 R |
| 2006/0130456 | A1* | 6/2006 | Suciu | ...................... F01D 5/066 60/226.1 |
| 2008/0283676 | A1 | 11/2008 | Jain et al. | |
| 2008/0310956 | A1* | 12/2008 | Jain | ........................ B64D 33/02 415/200 |
| 2010/0019101 | A1* | 1/2010 | Smith | ....................... F02C 7/04 244/53 B |
| 2010/0215479 | A1* | 8/2010 | Prasad | ................... B64D 33/02 415/119 |
| 2011/0167792 | A1* | 7/2011 | Johnson | ................ F01D 17/162 60/226.3 |
| 2011/0220217 | A1* | 9/2011 | Bensilum | ............... B64D 27/14 137/15.1 |

FOREIGN PATENT DOCUMENTS

| | | |
|---|---|---|
| GB | 1 499 574 | 2/1978 |
| GB | 2 259 114 A | 3/1993 |
| GB | 2 259 115 A | 3/1993 |
| WO | 2011141678 A1 | 11/2011 |

OTHER PUBLICATIONS

NASA "Power Turbine Thermodyanmics" (Year: 2015).*
Eric Adams "The World's Hugest Jet Engine is Wider Than a 737's Fuselage" (Year: 2016).*
Marwan "Optimum Turbofan Engine Performance Through Variation of Bypass Ratio" (Year: 2013).*
Wendus "Follow-On Technology Requirement Study for Advanced Subsonic Transport" (Year: 2003).*
Peters "Ultra-Short Nacelles for Low Fan Pressure Ratio Propulsors" (Year: 2014).*
Extended European Search Report for EP Application No. 14759888.2 dated Oct. 10, 2016.
International Preliminary Report on Patentability for International Application No. PCT/US2014/018544 dated Sep. 17, 2015.
International Search Report and Written Opinion for PCT Application No. PCT/US2014/018544, dated Jun. 27, 2015.
Extended European Search Report for EP Application No. 19174038.0 dated Aug. 21, 2019.

* cited by examiner

GAS TURBINE ENGINE INLET

BACKGROUND

This disclosure relates to a gas turbine engine inlet. More particularly, the disclosure relates to a relative position of a fan and a spinner relative to a fan nacelle inlet.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large fan blades. One type of gas turbine engine utilizes a high bypass flow to provide a significant portion of thrust from a fan arranged in the bypass flow path, which extends from an inlet of the gas turbine engine.

The inlet may be cambered such that a plane that is tangent to the inlet leading edge is tilted or drooped relative to the engine centerline, as shown by plane A in FIG. 2a. The angle of inlet droop may be in the range zero to six degrees, with the inlet tilted downward so that the inlet length at the top is longer than the length at the bottom. It is also known to have negative droop or negative scarf inlet designs such that the inlet length at the bottom extends furthest forward.

Inlet throat is defined at an axial position (at plane B) within the inlet that has a local minimum area normal to the flow direction. A plane located at the throat (plane B) may be tilted relative to the engine axis, similar to the inlet leading edge plane (plane A).

An inlet length (L1) is defined from the midpoint of the inlet leading edge plane A at inlet leading edge 165 to fan face plane C at the leading edge 169 of the fan 142, where plane C is taken perpendicular to the engine axis at the axial position of the fan blade tip leading edge. The ratio of inlet length L1 to fan leading edge tip diameter, $L1/D_{fan}$, is generally in the range 0.5 to 0.7 in typical inlet systems on high bypass ratio turbofan engines.

A fan spinner 170 forms the inner flowpath through the fan blade. The diameter of the spinner at the fan hub leading edge corresponds to $D_s$ in FIG. 2A. The hub/tip ratio of the fan, $D_s/D_{fan}$, is generally about 0.3 and may be in the range 0.25 to 0.35. The spinner may have a pointed leading edge with a generally conical shape, or it may have a blunt rounded leading edge shape. The axial length of the spinner from its leading edge to fan face plane C corresponds to L2. The ratio of spinner length to overall inlet length, L2/L1, is less than 0.5 in a typical gas turbine engine inlet on high bypass turbofan engines.

A typical internal area distribution for the gas turbine engine inlet is shown in FIG. 2b, normalized to the flow area at the fan face, $A_{fan} = \pi/4(D_{fan}^2 - D_s^2)$. There is a local minimum area at the inlet throat plane B, followed by a diffusing section from the throat 176 to the leading edge 174 of the fan spinner 170 in which the flow area increases, then there is a convergent section beginning approximately at the spinner leading edge 174 to the fan face (plane C) in which the flow area decreases due to the area blockage of the spinner 170.

SUMMARY

In one exemplary embodiment, a gas turbine engine including a fan nacelle and a core nacelle that provide a bypass flow path radially between. The fan nacelle has an inlet including a throat. The inlet has an inlet forward-most point. A fan is arranged in the bypass flow path and rotatable about an axis. The fan has a leading edge recessed from the inlet forward-most point an inlet length in an axial direction. A spinner has a spinner length from a spinner forward-most point to the leading edge. A ratio of the spinner length to inlet length is equal to or greater than about 0.5.

In a further embodiment of the above, includes a plane at the throat and a fan hub supporting the fan. A spinner is mounted on the fan hub forward of the fan. At least a portion of the spinner is arranged forward of the plane.

In a further embodiment of any of the above, a spinner forward-most point is arranged forward of the plane and aft of a forward-most point of the inlet.

In a further embodiment of any of the above, the ratio is about 0.65

In a further embodiment of any of the above, the length extends from a fan blade leading edge forward-most point to the inlet forward-most point.

In a further embodiment of any of the above, the fan includes a diameter. The ratio of the inlet length to diameter is equal to or less than about 0.4.

In a further embodiment of any of the above, the ratio of the inlet length to the diameter is about 0.3.

In a further embodiment of any of the above, an area is provided between the fan nacelle and the spinner. The area is monotonically convergent from the inlet to the fan.

In a further embodiment of any of the above, the gas turbine engine includes a compressor section fluidly connected to the fan. The compressor includes a high pressure compressor and a low pressure compressor. A combustor is fluidly connected to the compressor section. A turbine section is fluidly connected to the combustor. The turbine section includes a high pressure turbine coupled to the high pressure compressor via a shaft and a low pressure turbine.

In a further embodiment of any of the above, the gas turbine engine includes a geared architecture that operatively interconnects the turbine section to the fan.

In a further embodiment of any of the above, the gas turbine engine is a high bypass geared aircraft engine that has a bypass ratio of greater than about six (6).

In a further embodiment of any of the above, the gas turbine engine includes a Fan Pressure Ratio of less than about 1.45.

In a further embodiment of any of the above, the low pressure turbine has a pressure ratio that is greater than about 5.

BRIEF DESCRIPTION OF THE DRAWINGS

The disclosure can be further understood by reference to the following detailed description when considered in connection with the accompanying drawings wherein:

FIG. 2b graphically depicts an internal area distribution from the inlet leading edge to a fan face for the fan and inlet arrangement of FIG. 2a.

FIG. 3b graphically depicts an internal area distribution from the inlet leading edge to a fan face for the fan and inlet arrangement of FIG. 3a.

DETAILED DESCRIPTION

Figure 1:
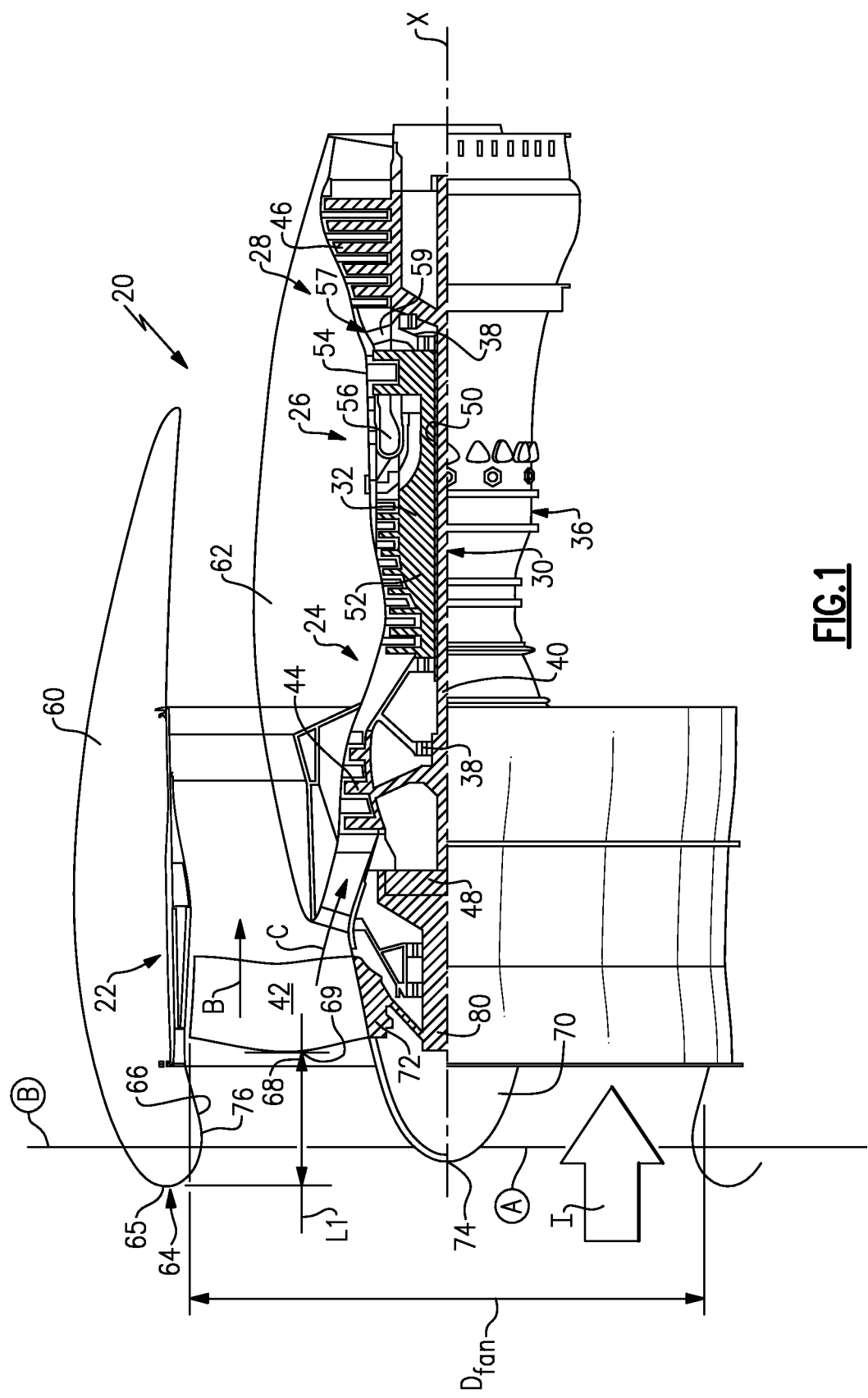
FIG. 1 schematically illustrates a gas turbine engine embodiment.
Figure 2A:
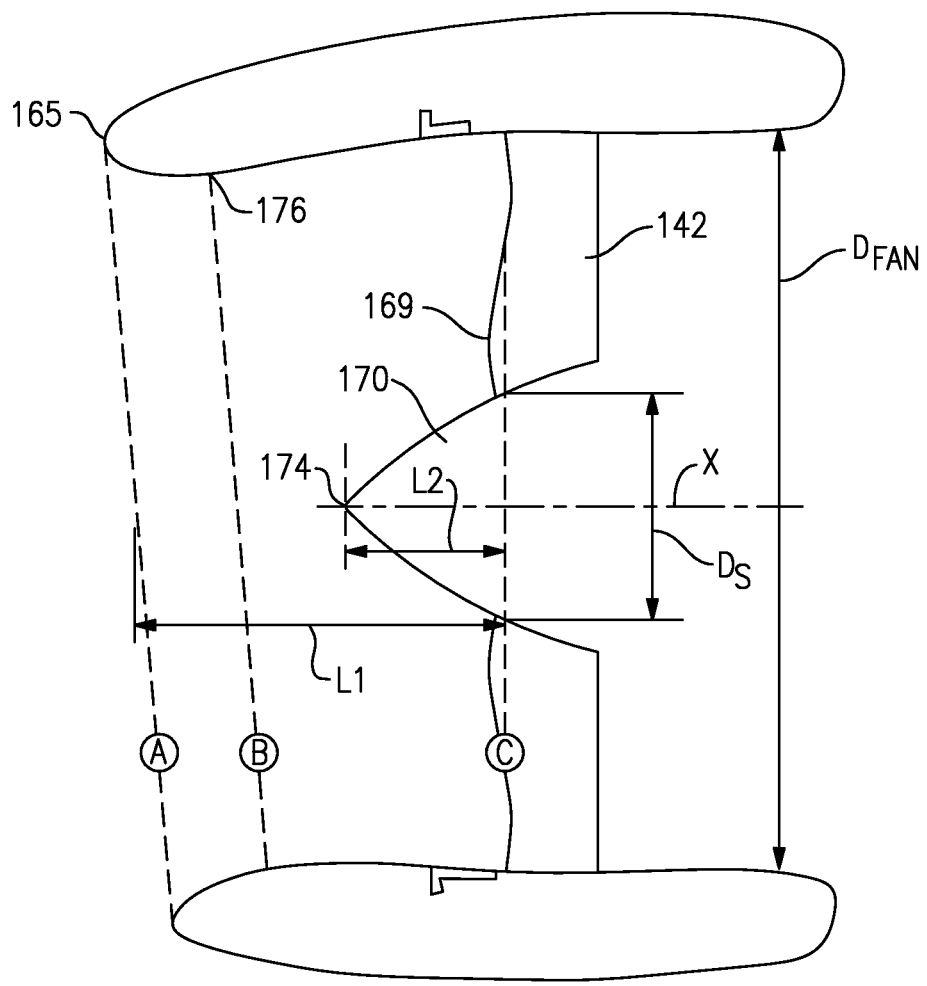
FIG. 2a schematically illustrates a prior art fan and inlet arrangement.
Figure 2B:
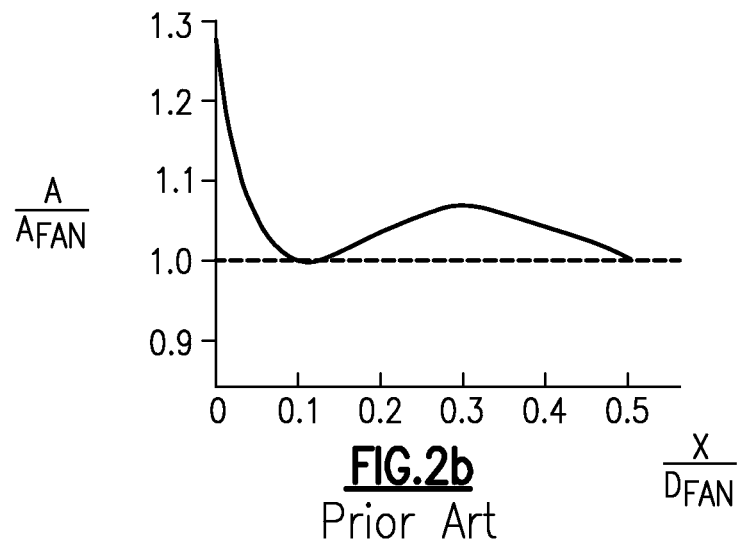

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The bypass flow path B is provided radially between a fan nacelle 60 and core nacelle 62. The fan nacelle 60 includes an inlet 64 that receives an inlet flow I into the engine 20. The inlet 64 includes an inner surface 66 that provides an annular shape having a throat 76 in plane B, which is the minimum cross-sectional area of the inlet 64 without a spinner 70 installed. The throat 76 is arranged upstream from the fan blades 42.

The fan blades 42 include a fan leading edge 68 having a leading edge forward-most point 69. The fan blades 42 have an outer diameter $D_{fan}$. The leading edge forward-most point 69 is spaced a length L1 from an inlet forward-most point 65 of the inlet 64 (in plane A).

The fan blades 42 are supported by a fan hub 72, which is rotationally driven through a fan shaft 80 coupled to the geared architecture 48. The spinner 70 is mounted to the fan hub 72 upstream from the fan blades 42 to provide an aerodynamic inner flow path to the fan section 22.

The L1/$D_{fan}$ ratio (sometimes referred to as an "LID ratio") of the engine 20 is less than or equal to about 0.4, and in one example, about 0.3. The term "about" means +/−0.05. The spinner 70 includes a spinner forward-most point 74, which is arranged significantly forward within the inlet 64 than a typical high bypass ratio engine. In the example illustrated, the spinner forward-most point 74 is arranged forward of the plane 78. In the example, the spinner forward-most point 74 does not extend forward of the inlet forward-most point 65.

The engine 20 has a relatively large diameter fan section 22, which adds weight to the engine 20. One way of reducing the weight of the engine 20 is to reduce the nacelle inlet length L1. However, a short inlet typically results in inlet lip flow separation under a high angle of attack, which results in a reduction of the efficiency of the fan section 22 and resulting in a corresponding reduction of the engine's thrust. To reduce the tendency for the flow to separate when using a short length L1, the spinner 70 is moved forward. With a forwardly-located spinner, the pressure at the nacelle inlet lip and inner surface 66 will reduce the shock at crosswind conditions and at high angles of attack when the engine is at full power.

Figure 3A:
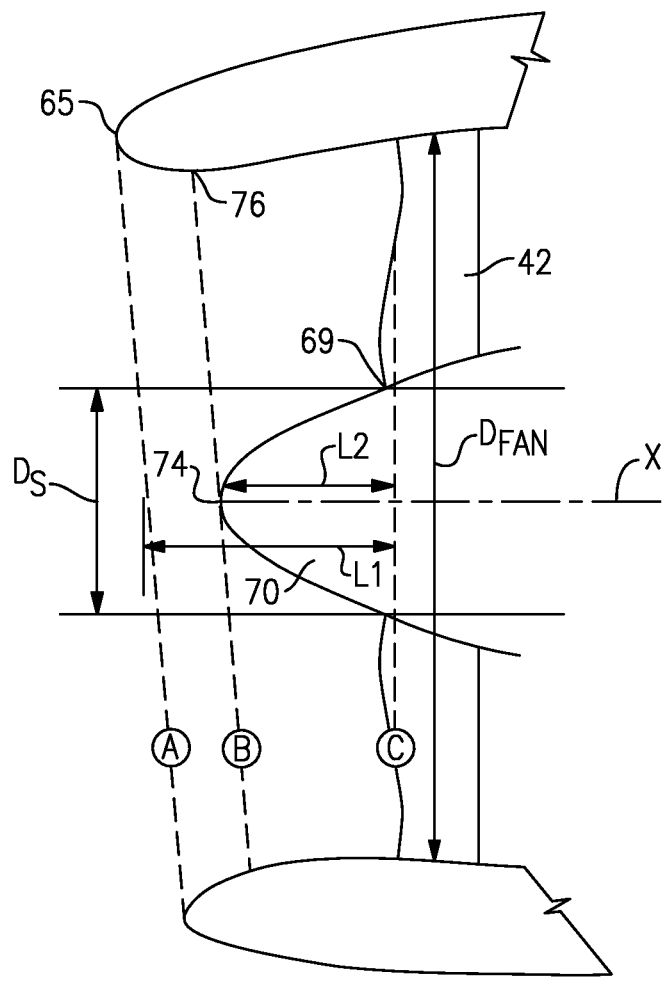
FIG. 3a schematically illustrates an example fan and inlet arrangement.

The gas turbine engine inlet 64 has a relatively short inlet and fan spinner such that the length of the spinner L2 is equal to or greater than half the overall length of the inlet L1, as shown in FIG. 3a. In one example embodiment, the ratio of spinner length to overall inlet length, L2/L1, is about 0.65 and the leading edge 74 of the spinner 70 is located at the throat 76 of the inlet 64.

Figure 3B:
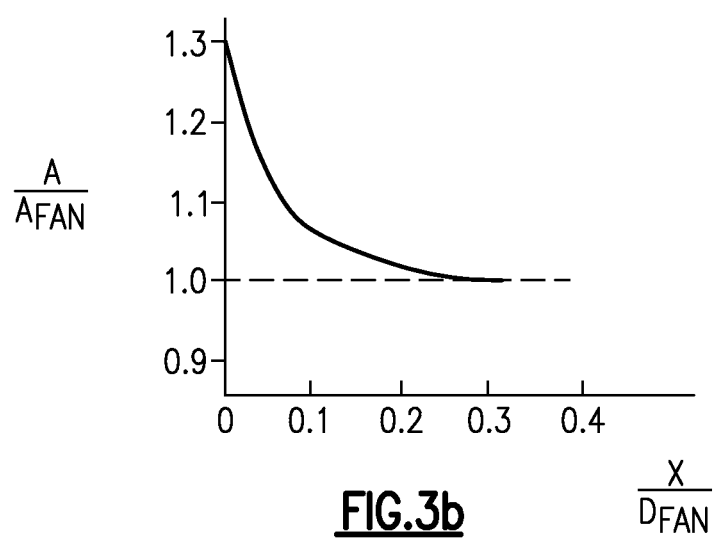

In this manner the effect of the area blockage of the fan spinner occurs at or immediately behind the throat 76, thus there is no local minimum internal area at the throat 76 and there is no diffusing section in the internal area distribution. The internal area distribution is monotonically convergent from the inlet leading edge to the fan face, as shown in FIG. 3b. A monotonically convergent internal area distribution is favorable to good aerodynamic performance of the gas turbine engine inlet at conditions of low flight speed and high engine power, particularly at high aircraft angle of attack or in crosswind operation.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    a fan nacelle and a core nacelle providing a bypass flow path radially between, the fan nacelle having an inlet including a throat, the inlet having an inlet forward-most point;
    a fan arranged in the bypass flow path and rotatable about an axis, the fan having a leading edge recessed from the inlet forward-most point an inlet length in an axial direction;
    a spinner having a spinner length from a spinner forward-most point to the leading edge; and
    a ratio of the spinner length to inlet length is equal to or greater than 0.5.

2. The gas turbine engine according to claim 1, comprising a plane at the throat and a fan hub supporting the fan, and the spinner mounted on the fan hub forward of the fan, at least a portion of the spinner arranged forward of the plane.

3. The gas turbine engine according to claim 2, wherein a spinner forward-most point is arranged forward of the plane and aft of a forward-most point of the inlet.

4. The gas turbine engine according to claim 1, wherein the ratio is 0.65.

5. The gas turbine engine according to claim 1, wherein the inlet length extends from a fan blade leading edge forward-most point to the inlet forward-most point.

6. The gas turbine engine according to claim 1, wherein the fan includes a diameter, and a ratio of the inlet length to diameter is equal to or less than 0.4.

7. The gas turbine engine according to claim 6, wherein the ratio of the inlet length to the diameter is 0.3.

8. The gas turbine engine according to claim 1, wherein an area is provided between the fan nacelle and the spinner, the area monotonically convergent from the inlet to the fan.

9. The gas turbine engine according to claim 1, wherein the gas turbine engine comprises:
    a compressor section fluidly connected to the fan, the compressor comprising a high pressure compressor and a low pressure compressor;
    a combustor fluidly connected to the compressor section;
    a turbine section fluidly connected to the combustor, the turbine section comprising:
        a high pressure turbine coupled to the high pressure compressor via a shaft; and
        a low pressure turbine.

10. The gas turbine engine according to claim 9, comprising a geared architecture operatively interconnecting the turbine section to the fan.

11. The gas turbine engine according to claim 2, wherein a of the spinner is arranged aft of the plane.

* * * * *